(12) United States Patent
Peters et al.

(10) Patent No.: US 9,378,449 B2
(45) Date of Patent: Jun. 28, 2016

(54) IN-LINE GIFT CARD PERSONALIZATION AND PACKAGING PROCESS

(71) Applicant: DataCard Corporation, Minnetonka, MN (US)

(72) Inventors: Jeffrey L. Peters, St. Louis, MO (US); Roger Potvin, Vero Beach, FL (US)

(73) Assignee: Entrust Datacard Corporation, Shakopee, MN (US)

( * ) Notice: Subject to any disclaimer, the term of this patent is extended or adjusted under 35 U.S.C. 154(b) by 127 days.

(21) Appl. No.: 14/196,554

(22) Filed: Mar. 4, 2014

(65) Prior Publication Data

US 2014/0182768 A1 Jul. 3, 2014

Related U.S. Application Data

(63) Continuation of application No. 12/442,845, filed as application No. PCT/US2007/080306 on Oct. 3, 2007, now Pat. No. 8,702,893.

(60) Provisional application No. 60/829,396, filed on Oct. 13, 2006.

(51) Int. Cl.
  *B32B 37/02* (2006.01)
  *B32B 37/14* (2006.01)
  (Continued)

(52) U.S. Cl.
  CPC ........ *G06K 19/07716* (2013.01); *B42D 15/045* (2013.01); *G06K 17/00* (2013.01); *B42D 25/285* (2014.10); *G06K 2017/0041* (2013.01)

(58) Field of Classification Search
  CPC .... B42D 25/285; B42D 17/045; B42D 25/00; G06K 19/07716; G06K 17/00; G06K 2017/0041; Y10T 156/17; G09F 1/00
  USPC ......... 156/277, 362, 538; 40/124.04, 124.191
  See application file for complete search history.

(56) References Cited

U.S. PATENT DOCUMENTS

| 4,384,196 A | 5/1983 | McCumber et al. |
| 4,897,533 A | 1/1990 | Lyszczarz |

(Continued)

FOREIGN PATENT DOCUMENTS

| EP | 1684213 | 7/2006 |
| JP | 2000-313130 | 11/2000 |

(Continued)

OTHER PUBLICATIONS

International Search Report of PCT/US2007/080306, dated Mar. 18, 2008.

(Continued)

*Primary Examiner* — Sonya Mazumdar
(74) *Attorney, Agent, or Firm* — Hamre, Schumann, Mueller & Larson, P.C.

(57) ABSTRACT

A machine that processes gift cards in an in-line process where the gift cards travel along a generally straight transport path from a card feed mechanism to a delivery end where the cards and carrier combinations are discharged. During the in-line processing, a magnetic stripe, integrated circuit chip or RFID tag on the gift cards can be encoded with account information, a serial number or other information. In addition, the cards are transported to a print mechanism that personalizes the cards with a bar code, account information, serial number or other information. After printing, the cards are transported to a gluing system which applies adhesive to one side of the cards. The cards are then transported to a feeding mechanism that feeds and applies a carrier to one or more cards.

16 Claims, 2 Drawing Sheets

(51) Int. Cl.

| | |
|---|---|
| *B32B 37/18* | (2006.01) |
| *B32B 38/14* | (2006.01) |
| *G09F 7/00* | (2006.01) |
| *G09F 5/04* | (2006.01) |
| *G06K 19/077* | (2006.01) |
| *B42D 15/04* | (2006.01) |
| *G06K 17/00* | (2006.01) |
| *B32B 37/10* | (2006.01) |
| *B42D 25/20* | (2014.01) |

(56) References Cited

U.S. PATENT DOCUMENTS

| | | | |
|---|---|---|---|
| 5,266,781 A | 11/1993 | Warwick et al. | |
| 5,388,815 A | 2/1995 | Hill et al. | |
| 5,403,236 A | 4/1995 | Greig | |
| 5,451,037 A | 9/1995 | Lundstrom | |
| 5,509,886 A | 4/1996 | Hill et al. | |
| 5,558,021 A | 9/1996 | Erhard et al. | |
| 5,632,511 A | 5/1997 | Longtin et al. | |
| 5,820,281 A | 10/1998 | Hill et al. | |
| 5,862,754 A | 1/1999 | Hill et al. | |
| 5,921,584 A | 7/1999 | Goade, Sr. | |
| 5,923,015 A | 7/1999 | Hill et al. | |
| 5,980,011 A | 11/1999 | Cummins et al. | |
| 6,203,069 B1 | 3/2001 | Outwater et al. | |
| 6,467,687 B1 | 10/2002 | Hill et al. | |
| 6,491,782 B1 | 12/2002 | Jaynes | |
| 6,715,268 B2 | 4/2004 | Hill et al. | |
| 6,729,656 B2 | 5/2004 | Kubert et al. | |
| 6,817,518 B2 | 11/2004 | Greene et al. | |
| 6,817,530 B2 | 11/2004 | Labrec et al. | |
| 6,837,959 B2 | 1/2005 | Daems et al. | |
| 6,846,278 B1 | 1/2005 | Hill et al. | |
| 6,902,107 B2 | 6/2005 | Shay et al. | |
| 6,957,737 B1 | 10/2005 | Frederickson et al. | |
| 7,036,723 B1 | 5/2006 | Hill et al. | |
| 7,059,532 B2 | 6/2006 | McCumber | |
| 7,080,041 B2 | 7/2006 | Nagel | |
| 7,097,726 B2 | 8/2006 | Hattori et al. | |
| 7,219,829 B2 | 5/2007 | Treat | |
| 7,465,370 B2 | 12/2008 | Daems et al. | |
| 7,503,503 B2 | 3/2009 | Riedl et al. | |
| 7,513,437 B2 | 4/2009 | Douglas | |
| 7,544,266 B2 | 6/2009 | Herring et al. | |
| 7,617,986 B2 | 11/2009 | Boria-Weiss et al. | |
| 7,770,519 B2 | 8/2010 | Schmitt et al. | |
| 7,900,845 B2 | 3/2011 | Stagg | |
| 2002/0130186 A1 | 9/2002 | Lasch et al. | |
| 2003/0066777 A1 | 4/2003 | Malone | |
| 2004/0020992 A1 | 2/2004 | Lasch et al. | |
| 2006/0102033 A1 | 5/2006 | Schmitt et al. | |
| 2006/0102035 A1 | 5/2006 | Schmitt et al. | |
| 2007/0251403 A1 | 11/2007 | St. John | |

FOREIGN PATENT DOCUMENTS

| | | |
|---|---|---|
| JP | 2001-39067 | 2/2001 |
| JP | 2001-62944 | 3/2001 |
| JP | 2001-88479 | 4/2001 |
| JP | 2002-11982 | 1/2002 |
| JP | 2002-96586 | 4/2002 |
| JP | 2002-187383 | 7/2002 |
| JP | 2002-236887 | 8/2002 |
| JP | 2002-244563 | 8/2002 |
| JP | 2003-237263 | 8/2003 |
| JP | 2004-188754 | 7/2004 |
| JP | 2005-002277 | 1/2005 |
| JP | 2006-244097 | 9/2006 |
| JP | 2006-249632 | 9/2006 |
| JP | 2013-018173 | 1/2013 |
| WO | 94/19196 | 9/1994 |
| WO | 94/21547 | 9/1994 |
| WO | 2006/026231 | 3/2006 |

OTHER PUBLICATIONS

Office Action issued Jan. 8, 2010 by the State Intellectual Property Office of China in related application No. CN 2007800382080 (with English translation).

Supplementary European Search Report and opinion for patent application No. 07 84 3753, dated Oct. 5, 2009.

American Express Gift Cards—https://www.americanexpress.com/gift/giftcardslanding.shtml: Mar. 2011.

IN-LINE GIFT CARD PERSONALIZATION AND PACKAGING PROCESS

FIELD

This disclosure relates to processes and equipment for in-line personalization and packaging of plastic cards such as gift cards.

BACKGROUND

There is increasing presence and use of gift cards in society. Gift cards are typically plastic cards that are attached to a carrier or backer for point-of-purchase display or retail fulfillment. A gift card can be purchased and has a value assigned to the card to allow the gift card to be used like cash to make purchases. Often, a gift card can be recharged to increase the balance remaining on the card.

The common method of processing gift cards involves personalization of the cards on one machine in a plant, re-palletizing or stacking the personalized cards, and then moving the cards to another location in the plant for affixing and final packaging. This is a problem operationally, as it requires floor space, manpower, and the risk of lost or damaged cards as they are moved about the plant. Plus, more days in the queue means less overall throughput of finished gift cards from the factory, meaning less total revenues and carrying costs.

There is a need for improvements in processes and equipment for personalizing and packaging gift cards.

SUMMARY

Improvements in processes and equipment for personalizing and packaging gift cards are described. The processes and equipment result in improved production rates, for example up to 20,000 or more gift card/carrier combinations per hour, minimize floor space, minimize capital equipment investment on the part of gift card manufacturers, minimize the amount of labor required to produce the gift cards, and minimizes work-in-process where cards are in the manufacturing process, but are not yet complete and ready for shipment to the end user/customer.

The gift cards are processed in an in-line process where the gift cards travel along a generally straight transport path from a card feed mechanism to a delivery end where the cards and carrier combinations are discharged. During the in-line processing, a magnetic stripe, integrated circuit chip (if present) or a radio frequency (RFID) tag on the gift cards can be encoded with account information, a serial number or other information. The machine can also read the magnetic stripe, the integrated circuit chip (if present) or the RFID tag to log the gift card, which can be used to, for example, determine the card and based on the reading, print information on the card and/or encode the magnetic strip, the chip or the RFID tag.

In addition, the cards are transported to a print mechanism that personalizes the cards with a bar code, account information, serial number or other information. After printing, the cards are transported to a gluing system which applies adhesive to one side of cards. The cards are then transported to a feeding mechanism that feeds and applies a carrier to one or more cards.

The information applied by the print mechanism generally corresponds to the information encoded on the card. For example, if the information encoded on a gift card is an account number, and the print mechanism applies a bar code, the bar code will match the account number. If desired, a camera system or the like can be provided to verify the match of the printed information to the encoded information, as well as placement of the printed information.

The print mechanism can be, for example, an inkjet printhead, preferably a drop on demand (DOD) printhead that prints with ultraviolet (UV) ink. The use of a UV DOD head allows for faster printing speeds and/or higher print quality than other printing methods using water or solvent-based inks/methods. In the case of a UV DOD head, a UV lamp will be provided to cure the UV ink. If the faster print speed or print quality of a UV DOD head is not required, other types of printing techniques that use other types of printheads can be used.

In one embodiment, a scratch-off label is applied over secure information on the card, for example a pin number or other secure information.

Cards that are not encoded or printed properly are diverted after being attached to a carrier. The computer controller/software preferably has the ability to log the bad card and carrier combination, and do an automatic remake of the card and carrier. This is important as some end customers require that the order be shipped 100% inspected, verified and complete, with no missing numbers and no duplicate numbers.

In other embodiments, the carriers can be printed with information corresponding to information on the cards. In addition, the card and carrier combination can be wrapped or packaged in-line.

DRAWINGS

DETAILED DESCRIPTION

Figure 1:
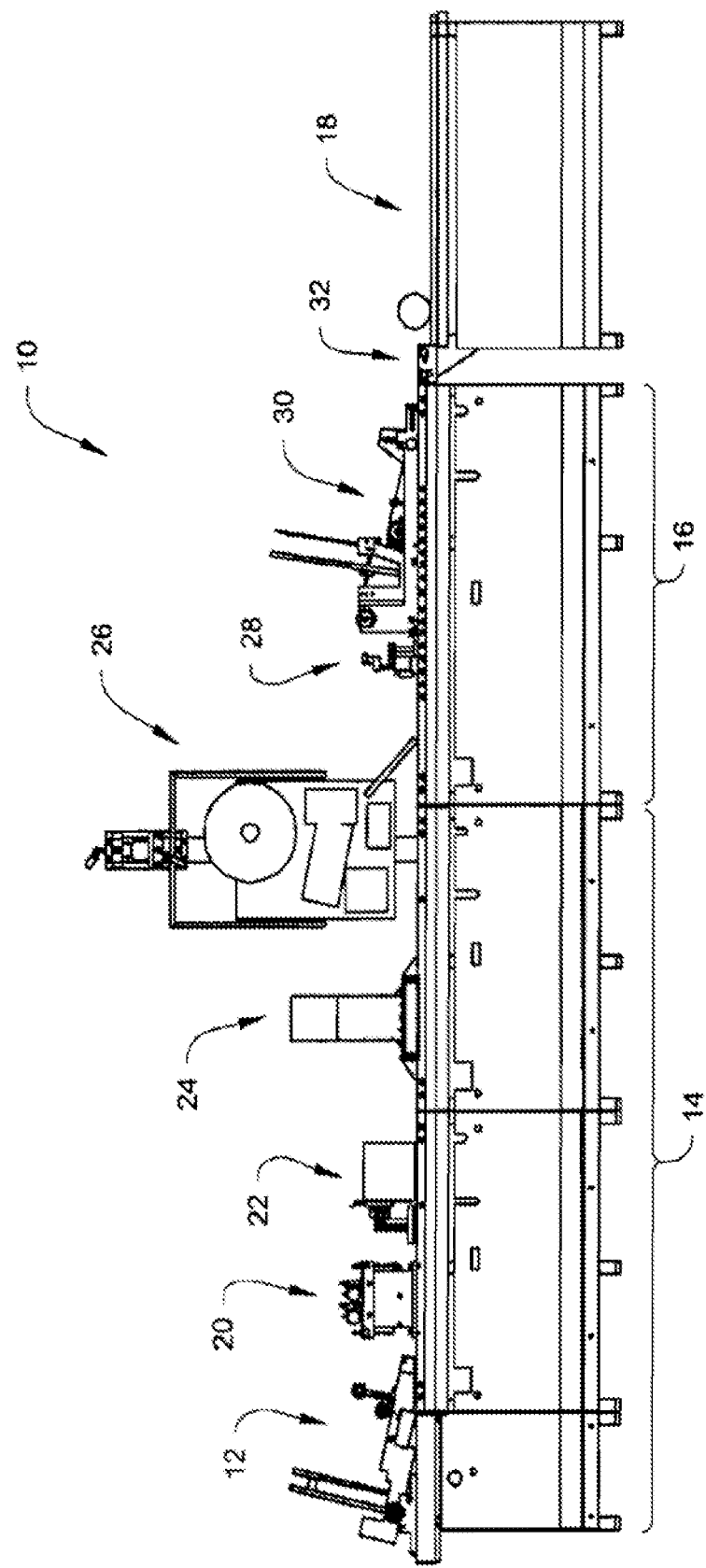
FIG. 1 is a side view of in-line gift card processing machine incorporating the inventive concepts.
Figure 2:
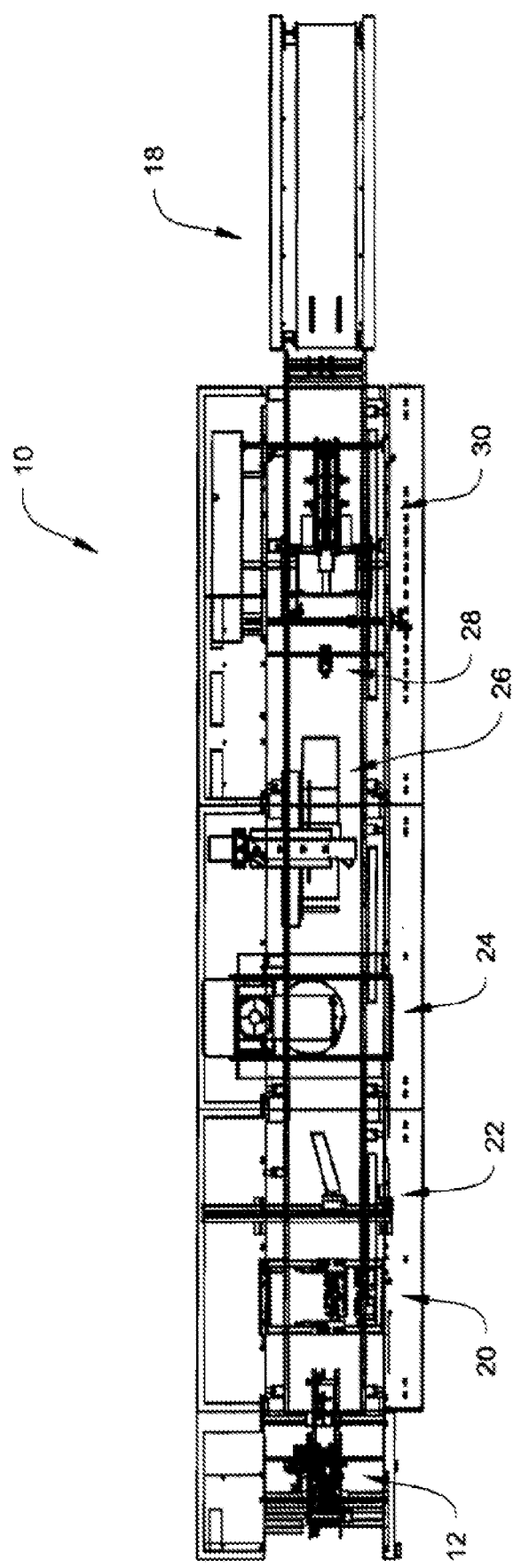
FIG. 2 is a to view of the machine in FIG. 1.

With reference to FIGS. 1 and 2, an inline gift card processing machine 10 is illustrated. The machine 10 includes a card feed mechanism 12, a personalization portion 14 and an affixing portion 16. The feed mechanism 12 is configured to hold a plurality of gift cards, for example CR-80 sized gift cards, waiting to be processed by the machine 10, and to feed the cards one at a time into the machine. The personalization portion 14 is provided with one or more mechanisms configured to perform personalization operations on each card. The affixing portion 16 is configured to take a card that has been personalized, apply an adhesive to the card, and affix the card to a carrier.

The personalization portion 14 described herein is generally similar to the CPST MJ7500 machine available from DataCard Ga-Vehren Corp. of St. Louis, Miss., which is a gift card personalization system that incorporates magnetic stripe encoding and UV printing. The affixing portion 16 described herein is generally similar to the DGV300 machine available from DataCard Ga-Vehren Corp. of St. Louis, Miss., which is a gift card packaging system that applies adhesive to gift cards that are manually loaded into the system and then affixes the gift cards to carriers.

Personalization as used herein means the application of information to the card that is unique to the card. Unlike other types of plastic cards, such as credit cards or identification cards, the information added to the card is not specific to an individual as the ultimate user of the card is not typically known at the time of processing the card with the machine 10.

Processing of the gift cards by the machine 10 occurs in-line, where the gift cards travel along a generally straight transport path from the card feed mechanism 12, through the personalization portion 14, through the affixing portion 16, to a delivery section 18. In the illustrated embodiment, the cards are actually "face down" as they travel through the machine 10, with the back surface of the card facing upward.

In the embodiment illustrated in FIG. 1, the personalization portion 14 includes an encoding station 20 and a print station 22. The encoding station 20 is configured to encode information onto a storage mechanism on the card, for example a magnetic stripe, an integrated circuit chip or an RFID tag. The station 20 can be configured to encode information onto one or more than one of these storage mechanisms. Information that can be encoded includes an account number, a serial number or other information that is unique to each individual card. While the encoding station 20 is illustrated as being separate from the card feed mechanism 12, the card feed mechanism can include encoding capability such that encoding occurs in the mechanism 12. After encoding, the encoded information can be read by a suitable reader to confirm that the card was encoded properly by comparing the read encoded information against a database containing information that was used to produce the encoded information.

The station 20 or a separate station can also read the magnetic stripe, the integrated circuit chip (if present) or the RFID lag to log the gift card. The information read can then be used to, for example, determine the card and based en the reading, print information on the card and/or encode the magnetic strip, the chip or the RFID tag.

The print station 22 is configured to personalize the cards with a bar code, account information, serial number or other information that generally corresponds to the information encoded on the cards. The print mechanism is for example, an inkjet printhead, preferably a drop on demand (DOD) printhead that prints with ultraviolet (UV) ink. The use of a UV DOD head allows for faster printing speeds and/or higher print quality than other printing methods using water or solvent-based inks/methods. If the faster print speed or print quality of a UV DOD head is not required, other types of printing techniques that use other types of printheads can be used.

The printing preferably occurs on the back side (i.e. upward facing side) of the card. However, if desired, a mechanism could be provided to flip the card to allow the print station 22 to print on the front side of the card, and after printing, flip the card again so that the card is again front side down. Alternatively, a suitable print mechanism could be provided under the card path to permit printing on the front side of the card without flipping the card.

After printing, the UV ink is cured by transporting the card under a DV lamp 24. In addition, a camera system (mot shown) verifies the match of the printed information, for example a bar code, to the encoded information, as well as placement of the printed information on the cards. To verify a bar code, a commercially available barcode scanner can be provided to actually "read" the bar code. The information read from the bar code is then compared to the information encoded on the card. The verification occurs by comparing the information read from the bar code against the information that is stored in the database that was used to produce the encoded information. Since the encoded information is earlier compared against the database information, by comparing the No code information against the database information, one can determine whether the bar code information matches the encoded information. Alternatively, the camera up verify the bar code by capturing an image of the bar code, and software in the system controller actually decodes the bar code. Either method can be used, depending upon how one chooses to configure the machine.

A labeler station 26 is optionally included that is configured to apply a scratch-off label over secure information on the cards, for example over a pin number. In certain applications where security concerns are satisfied, a peel-off label could be used instead of a scratch-off label.

The cards are then transported to the affixing portion 16 which takes the personalized cards and attaches them to carriers. The affixing portion 16 includes an adhesive station 28 which applies an adhesive to the back surface of the cards so that the cards are ultimately adhered to the carriers with the front surface of the card visible. The adhesive can be any adhesive suitable for adhering the cards to a carrier. For example, the adhesive can be a hot melt glue.

After the adhesive is applied, the cards are transported to a feed mechanism 30 that feeds carriers one-by-one and affixes the carriers to one or more cards. Typically, a single card and a single carrier are affixed together. However, a plurality of cards can be affixed to a single carrier. The carriers make the cards suitable for point-of-purchase display and are typically printed with information specific to the issuer of the gift cards. If desired, the carriers can also be printed with information corresponding to the information encoded and printed on the cards, for example with an account number or serial number.

Card and carrier combinations where the cards are properly encoded and printed are discharged to the delivery section 18. Card and carrier combinations with an improperly encoded or printed card are diverted diverter 32 prior to reaching the delivery section 18.

In one option, the machine 10 can include an in-line station that wraps or packages the card and carrier combinations.

Transport of the cards through the machine 10 can occur using transport mechanisms known in the art. For example, a vacuum transport belt(s) can be used. Alternatively, drive rollers or a lugged chain or belt can be used.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range or equivalency of the claims are intended to be embraced therein.

The invention claimed is:

1. A method of processing gift cards, comprising:
feeding individual gift cards one at a time from a card feed mechanism into a processing machine, each gift card including a magnetic stripe, an integrated circuit chip, or an RFID tag;
using the processing machine to apply information that is not specific to or associated with an individual on the magnetic stripe, integrated circuit chip or RFID tag of each gift card fed into the processing machine,
after the application of the information, using the processing machine to print information on a back surface of each gift card, the printed information is not specific to or associated with an individual and corresponds to the information applied on the magnetic stripe, integrated circuit chip or RFID tag, and
after printing the information, using the processing machine to affix each gift card to a respective carrier that is suitable for point-of-purchase display with the back surface facing the carrier,
wherein the application of the information, the printing of the information, and the affixing are performed in an in-line process along a straight, continuous mechanical transport path of the gift cards through the processing machine.

2. The method of claim 1, prior to affixing the gift card to the carrier, using the processing machine to apply an adherent to the back surface of each gift card and using the adherent to affix the gift cards to their respective carriers.

3. The method of claim 1, wherein the printing of the information comprises using ultra-violet curable ink, and comprising curing the ultra-violet curable ink.

4. The method of claim 1, comprising using the processing machine to apply a scratch-off or peel-off label to each gift card, wherein the labels are applied over secure information on the gift cards.

5. The method of claim 1, comprising using the processing machine to verify the printed information or the application of information on the magnetic stripe, integrated circuit chip or RFID tag.

6. The method of claim 4, wherein the secure information comprises a pin number.

7. The method of claim 1, comprising using the processing machine to wrap or package each gift card and carrier as part of the in-line process.

8. The method of claim 1, comprising printing each carrier with information specific to the issuer of the gift cards.

9. The method of claim 1, comprising printing each carrier with information corresponding to the information applied on the magnetic stripe, integrated circuit chip or RFID tag of its associated gift card and corresponding to the information printed on the back surface of the associated gift card.

10. The method of claim 1, comprising using a camera of the processing machine to verify the information printed on the back surface of each gift card.

11. The method of claim 1, prior to affixing the gift card to the carrier, printing on either the back surface or a front surface of each card, thereafter directing each card into a card flipping mechanism and flipping the card using the card flipping mechanism, and thereafter printing on the other one of the back surface or the front surface.

12. A method of processing gift cards, comprising:
applying information that is not specific to or associated with an individual on a magnetic stripe disposed on a back surface of a gift card,
directly printing information on the back surface of the gift card using ultra-violet curable ink, the printed information is not specific to or associated with an individual and corresponds to at least some of the information applied on the magnetic stripe, and
after applying the information and printing, affixing the gift card to a carrier that is suitable for point-of-purchase display with the back surface facing the carrier,
wherein the application of the information, the printing of the information, and the affixing are performed in that sequence in an in-line process along a generally straight, continuous mechanical transport path of the gift card.

13. A method of claim 12, further comprising reading the information applied on the magnetic stripe and reading the information printed on the back surface of the gift card, and diverting the carrier and the gift card mounted thereon if the information read from the magnetic stripe or the printed information read from the back surface of the gift card does not correspond to information in a database.

14. The method of claim 13, comprising remaking the gift card and carrier that are diverted.

15. The method of claim 12, wherein the printing is performed by a drop on demand printhead.

16. The method of claim 12, wherein after printing and prior to affixing, applying an adhesive to the back surface of each gift card, and thereafter affixing the gift card to the carrier.

\* \* \* \* \*